(12) United States Patent
Trayer

(10) Patent No.: US 10,495,504 B2
(45) Date of Patent: Dec. 3, 2019

(54) APPARATUS AND METHOD FOR LIQUID-LEVEL DETECTION OF ENCLOSURE TANK

(71) Applicant: John P Trayer, Los Altos Hills, CA (US)

(72) Inventor: John P Trayer, Los Altos Hills, CA (US)

(*) Notice: Subject to any disclaimer, the term of this patent is extended or adjusted under 35 U.S.C. 154(b) by 954 days.

(21) Appl. No.: 14/922,147

(22) Filed: Oct. 24, 2015

(65) Prior Publication Data

US 2017/0115152 A1   Apr. 27, 2017

(51) Int. Cl.
*G01F 23/02* (2006.01)
(52) U.S. Cl.
CPC .................... *G01F 23/02* (2013.01)
(58) Field of Classification Search
CPC ....................................................... G01F 23/02
See application file for complete search history.

(56) References Cited

U.S. PATENT DOCUMENTS

| | | | | |
|---|---|---|---|---|
| 2,943,530 A | * | 7/1960 | Nagel | G01F 23/2922 359/439 |
| 3,273,267 A | * | 9/1966 | Willman | D06F 75/14 38/77.2 |
| 3,796,098 A | * | 3/1974 | Trayer | G01F 23/2922 116/DIG. 5 |

* cited by examiner

*Primary Examiner* — Lisa M Caputo
*Assistant Examiner* — Alex T Devito
(74) *Attorney, Agent, or Firm* — Fang Wu

(57) ABSTRACT

A liquid-level gauge is provided, which includes a body of transparent material having a head part connected to an elongated part with an end region formed with two facets of 45 degrees relative to a vertical line of sight along the elongated part with a common linear tip portion disposable into a matching socket to engage with a liquid-level in an enclosure tank. The liquid-level gauge includes a horizontal second planar member coupled to a first planar member inserted to a slot cut vertically into the elongated part from the common linear tip portion. The first planar member is engraved a first legend on two opposite sides and the second planar member is engraved a second legend on top side facing the two facets. The head part forms an aperture allowing a view of an image bearing the first/second legend when the liquid-level is fully below/above the two facets.

17 Claims, 5 Drawing Sheets

APPARATUS AND METHOD FOR LIQUID-LEVEL DETECTION OF ENCLOSURE TANK

BACKGROUND

This invention relates to liquid-level detection for an enclosed tank or vessel, and more particularly to an apparatus that in some embodiments may be implemented without any moving parts and a method of using ambient light for visually detecting liquid-level either at or below a normal range in an enclosure tank.

Many enclosed devices depend for their proper functioning on the maintenance of a particular liquid-level within the enclosure tank or liquid vessel, and many systems have been developed for gauging such liquid-levels. Among such systems, however, few are well adapted for ultra-reliable performance in extremes of weather or for use on hazardous equipment such as medium voltage electrical switch gear and distribution equipment.

Many prior art devices have often been too complex for the degree of reliability required, or too expensive for practical application. Others have been susceptible to fouling by the certain types of liquid, such as transformer oil. Many, too, have been difficult to read or ambiguous in their indication. One particular prior art liquid-level gauge disclosed in U.S. Pat. No. 3,796,098 had features that people desired for their applications in gauging the liquid-level in an enclosure tank, but allowed potentially ambiguous scenarios such as due to residue, fowling, or the like.

SUMMARY

The liquid-level gauge device of one embodiment of the present invention provides an improved gauge device with no electrical or mechanically active parts for detecting liquid-level in an enclosed vessel. One embodiment features an elegant design that provides high reliability. Its use of ambient light for illumination renders it quite resistant to fouling by the liquid being measured, and permits applications for handling hazardous liquids safely.

In one embodiment, the gauge includes substantially static parts for providing direct visual detection of liquid-level either within a normal range or below certain level. Such embodiment may be used in a fully enclosed weatherproof tank while preserving submersibility and safety since it is not dependent upon any power supply or moving mechanical parts for its operation but merely based on physical presence or absence of the gauged liquid.

In a specific embodiment, the present invention provides a liquid-level gauge for an enclosure tank and the like. The liquid-level gauge includes a body of transparent material having a head part connected to an elongated part with an end region vertically disposable through a matching socket with a collar to be engaged with a liquid-level in the enclosure tank. The body of transparent material allows a vertical line of sight from outside via the head part to the end region inside the matching socket. The end region includes two facets formed from two opposing peripheral sides of the elongated part toward a common linear tip portion with an angle of approximately 45 degrees relative to the vertical line. Additionally, the liquid-level gauge includes a first planar opaque member partially inserted in a slot cut from the linear tip portion along the vertical line into the elongated part, the first planar opaque member bearing a first legend on each of two opposite sides. Furthermore, the liquid-level gauge includes a second planar opaque member perpendicularly coupled with the first planar member and attached at the linear tip portion to form two half planes bearing a second legend facing the two facets respectively. Moreover, the first legend is visible from the head region when the two facets are fully above the liquid-level in the enclosure tank and the second legend is visible from the head region when the two facets are fully submerged below the liquid-level at a normal range in the enclosure tank. In an embodiment, a dimmed view with neither the first legend nor the second legend being clearly visible is still an indicator that the liquid-level is below normal range.

In another specific embodiment, the present invention provides a method for detecting liquid-level in an enclosure tank or the like. The method includes providing a body of transparent material having a head part connected to an elongated part with an end region allowing a vertical line of sight from outside via the head part to the end region. The end region includes two facets formed from two opposing peripheral sides of the elongated part toward a common linear tip portion with an angle of approximately 45 degrees relative to the vertical line. Additionally the method includes assembling a first planar member of opaque material coupled perpendicularly with a second planar member of opaque material to the elongated part. The first planar member engraved with a first legend on each of two opposite sides is inserted partially into a slot cut from the linear tip portion along the vertical line into the elongated part and the second planar member is attached at the linear tip portion to form two half planes engraved with a second legend facing the two facets respectively. Moreover, the method includes disposing the elongated part down to a socket with the head part being stopped at a collar through a top wall into the enclosure tank with the end region including the two facets and the first planar member coupled with the second planar member being engaged with the liquid-level in the enclosure tank.

In an alternative embodiment, the present invention provides a liquid level gauge. The liquid level gauge includes a body portion having an axis generally corresponding to a normal line of sight from an outer end to an inner end. The liquid level gauge further includes a tip portion positioned at the inner end of the body portion. The tip portion has a first facet arranged at a first angle. Additionally, the liquid level gauge includes a first legend bearing portion proximate the tip portion in a first orientation to the tip portion. The first legend bears portion including a first visible indicator. The first visible indicator is arranged to be visible from the outer end of the body when a medium having an adequately differing index of refraction from the tip portion is present adjacent to the first facet. Moreover, the liquid level gauge includes a second legend bearing portion proximate the tip portion in a second orientation having a second angle relative to the first orientation of the first legend bearing portion. The second angle is different than the first angle. The second legend bears portion including a second visible indicator. The second visible indicator is visible from the outer end of the body by line-of-sight when a medium having a similar index of refraction to the tip portion is present adjacent to the first facet.

Many advantages are provided by various embodiments of the present invention. For example, some embodiments of a liquid-level detection device of the character described in the specification provide a visual and relatively unambiguous indication of both low and normal liquid-levels with low susceptibility to fouling by the liquid, mechanical failure or power supply interruption.

Additionally, some embodiments of the present invention provide a liquid-level detection device which is elegant and inexpensive in its construction, and which will further serve as a tamper-proof fill and inspection port for the tank. Further objects and advantages of some embodiments of the present invention will become apparent as the specification proceeds, and new and useful features thereof will be fully defined in the claims attached hereto.

While only the preferred forms of the invention have been shown here, it should be understood that various changes or modifications may be made within the scope of the claims attached hereto without departing from the spirit of the invention.

DESCRIPTION OF THE PREFERRED EMBODIMENTS

A combination of a visual liquid-level warning or detection gauge and a filler plug for liquid storage tanks is described herein according to various embodiments. Liquid storage tanks are used in a variety of industries and applications including medium voltage switchgear and the electrical transport industry generally. Liquid-holding vessels with opaque enclosures are applied in even broader fields and the present invention in various embodiments may be applied to such other fields as well. Some embodiments of the present invention provide a visual liquid-level warning gauge device with elegant construction and cost effectiveness improving reliability and reducing ambiguity on 'full' or 'low' level fluid indication.

Figure 1:
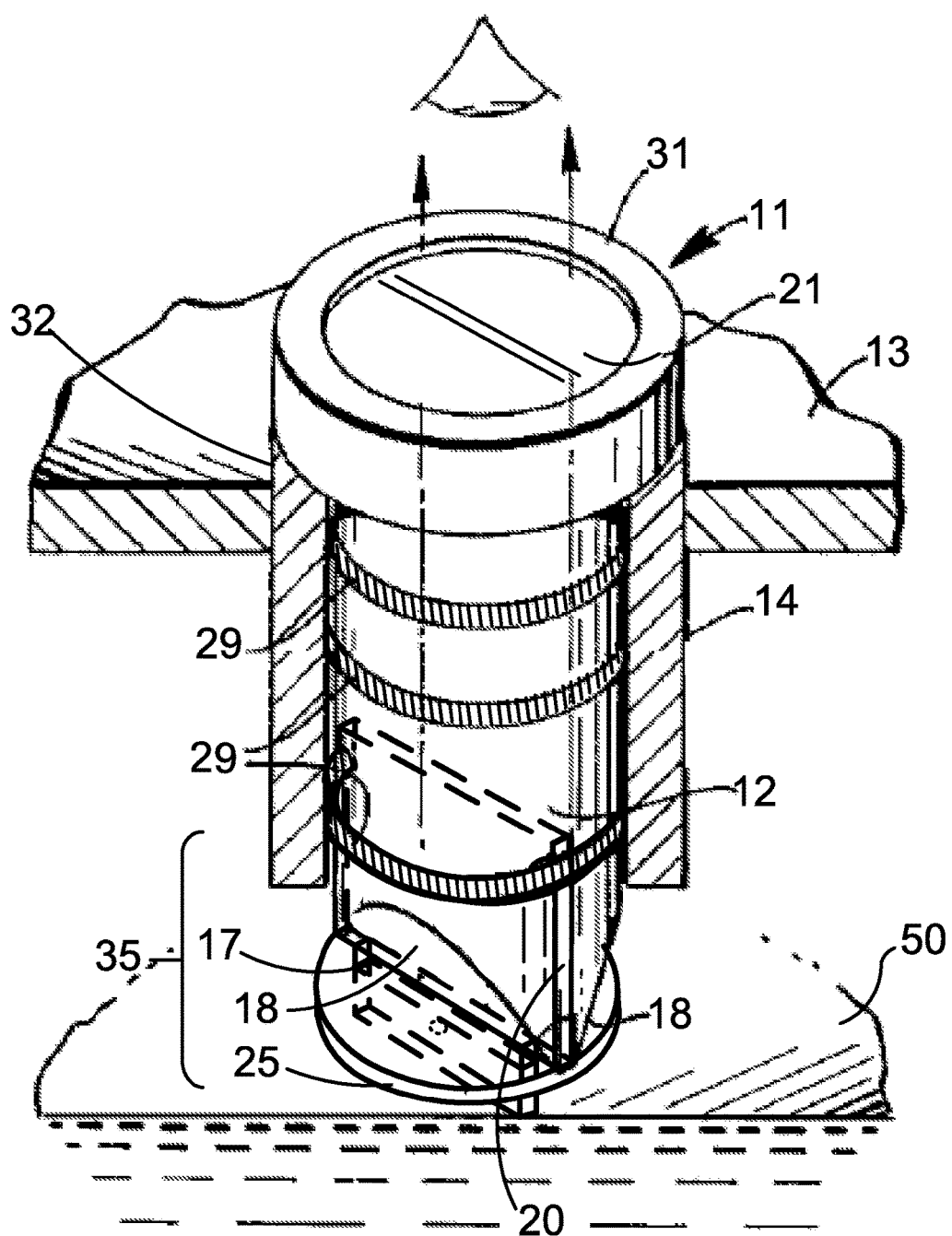
FIG. 1 is a perspective view of the liquid-level gauge device having an end region configured to have two angled facets disposed in a socket of a liquid tank according to an embodiment of the present invention.

FIG. 1 is a perspective view of the liquid-level detection gauge device according to an embodiment of the present invention. This diagram is merely an example, which should not limit the scope of the claims herein. As shown, the liquid-level detection gauge device 11 has an elongated body part 12 made of a transparent material connected to a head part 31 with an expanded lateral dimension relative to the body part 12 forming a plug. The plug is disposed in a round collar 32 through a lid 13 of the liquid-containing enclosure tank (usually in vertical direction from top). In a specific embodiment, the collar 32 optionally includes an extended section 14 with a depth below a bottom surface of the lid 13 into the enclosure tank. The expanded portion of the head part 31 on the plug seats against a collar 32 to limit the plug movement into the tank. The elongated body part 12 includes an end region 35 beveled into two facets 18 each forming an angle of about 45 degrees from the vertical line along the elongated body 12. Each facet 18 is configured to allow internal reflection for incoming ambient light along the vertical line if a material on the other side of the facets has a sufficient lower refraction index than the transparent material.

Figure 2:
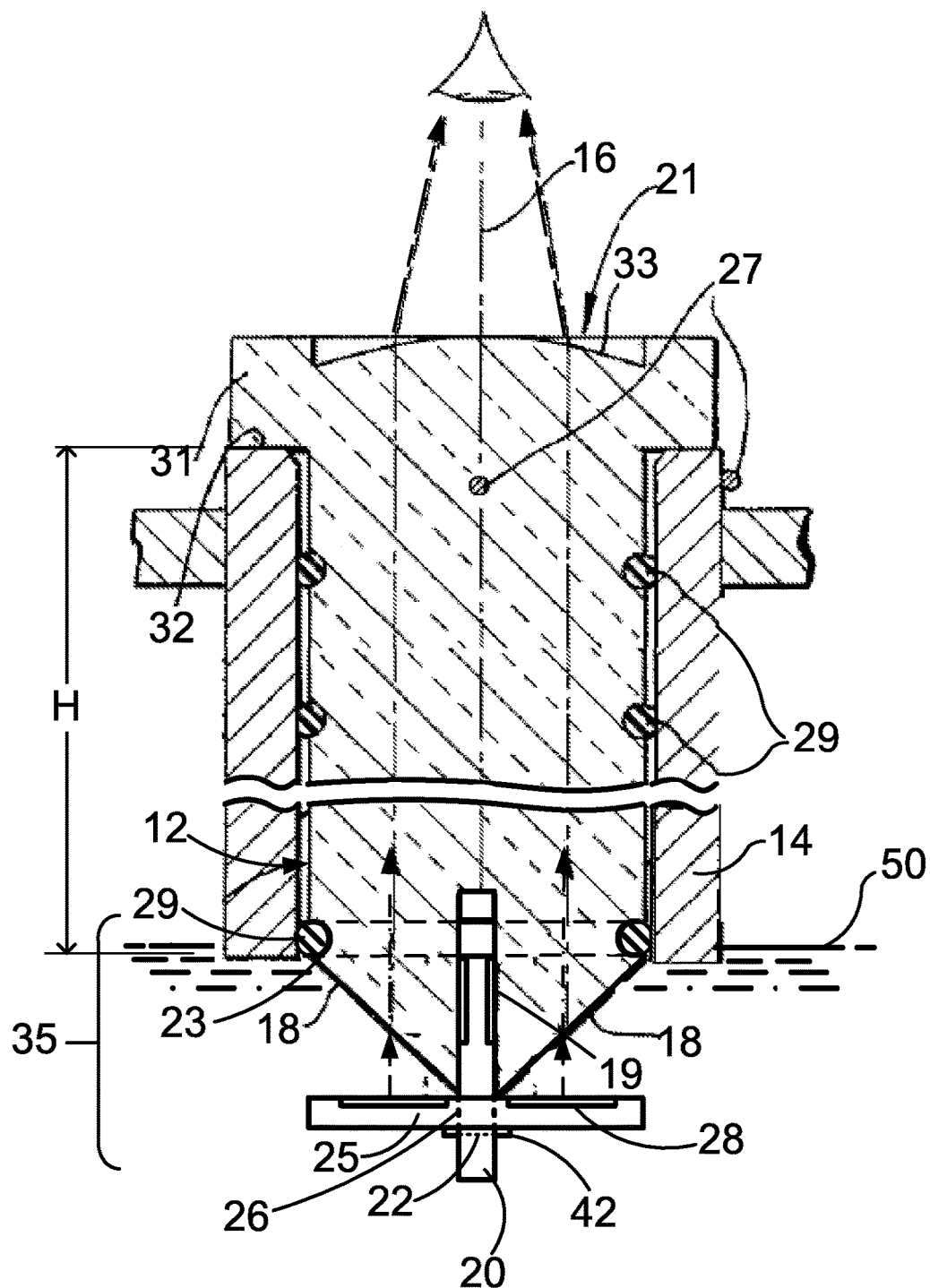
FIG. 2 is a cross-sectional view of the liquid-level gauge device of FIG. 1, shown with normal range liquid-level in the tank according to an embodiment of the present invention.

FIG. 2 is a cross-sectional view of the liquid-level gauge device of FIG. 1, shown with normal range liquid-level in the tank according to an embodiment of the present invention. This diagram is merely an example, which should not limit the scope of the claims herein. As shown, in an embodiment, when a total length H of the body part 12 of the liquid-level gauge device 11 is fully inserted into inner region of the collar 32 so that the end region 35 is substantially below the extended section 14 which corresponds to a full or normal range level for the stored liquid in the enclosure tank. In other words, the two facets 18 should be fully submerged into the liquid if the liquid level is in the normal range. In an alternative embodiment, the depth of the extended section or socket 14 beneath the bottom surface of lid 13 should be made according to the type of liquid and corresponding definition of "full" or "normal range" of the liquid stored in the enclosure tank.

In a specific embodiment, the two facets 18 join at a common linear tip portion 17 where a slot is cut vertically into the elongated body part 12. A first shaped planar member 20 of an opaque material is provided to insert into the slot. Additionally a second shaped planar member 25 of an opaque material is provided to be perpendicularly or horizontally coupled to the first shaped planar member 20. The second shaped planar member in this embodiment has its top side attached to the common linear tip portion 17 and has a bottom region with a reduced dimension of the first shaped planar member 20 that passes through an opening of the second shaped planar member 25. In other embodiments, as one of skill in the art will appreciate, the liquid level gauge could be inserted into a socket such as the extended section 14 but oriented differently, for example into a sidewall of a liquid enclosure, such that the orientation is orthogonal compared with that described in illustrated embodiments.

In another specific embodiment, the elongated body part 12 is made of cylindrical shape such that several O-rings 29 can be installed to respective recessed notches formed surrounding circumferential surface. The diameter of the cylindrical shape is designed to be slightly less than the inner diameter of the collar 32 (or the extended socket 14) so that a small gap remains when the elongated body part is plugged. The O-rings are used for sealing the small gap between the disposed elongated body part 12 and inner wall of the socket 14 to prevent leakage of liquid stored in the enclosure tank. At least one notch is formed next to upper edges of the two facets 18, which is blocked by the installed O-ring 29.

The first planar member 20 has substantially square shape with two notches formed near top region to match the recessed notch formed on the elongated body part 12 for holding the O-rings 29. The bottom region of the first planar member 20 has a reduced dimension. As shown in FIG. 2, and particularly in FIG. 4 and FIG. 5 below, each of two opposite sides of the first planar member 20 is engraved with a first legend 19. In various embodiments, the legend may be one or more letters, a pattern or symbol and/or certain colors. The second planar member 25 is substantially a round disk shape having a narrow linear opening formed in central part its diameter, which is designed for allowing the bottom region of the first planar member 20 to pass through when coupling them together while a small portion of top side surface beyond the opening of the second planar member 25 is in touch with the common linear tip portion 17. This configuration divides the disk shaped second planar member into two half planes. As seen in FIG. 2, and particularly in FIG. 6 below, the top side of each of the two half planes is engraved with a second legend 28 including certain letters or symbols that in one embodiment are color coded to be distinct from the first legend 19. Around the cylindrical shape on upper region of the elongated body part 12, there are several additional O-rings 29 installed with corresponding recessed notches formed surrounding the circumferential surface of the elongated body part 12 for sealing the small gap to ensure no leakage when disposing the gauge device 11 to the inner wall of the collar 32 and the socket 14. The length of the elongated body part 12 is designed to be equal to total length of the collar 32 and socket 14, sufficient long to have the end region 35 engaged with the liquid level at a predetermined normal range inside the enclosure tank. In one embodiment, the elongated body part 12 may include an adjustable portion whereby the length of the body is adjusted for different vessels or fluid levels.

In a specific embodiment with the liquid-level being normally above the two facets 18, as shown in FIG. 2, the facets 18 form an interface between the transparent material and the liquid or air space left with a lower liquid-level. The transparent material of the gauge device 11 usually is selected from acrylic glass or soda-lime glass or quartz, having a refractive index that is comparable with that of the liquid. Thus, this interface is partially transparent for light to pass through in either in/out direction. This allows a formation of a normal line of sight connecting an aperture 21 of the head part 31 to the top side of the second planar member 25 facing the two facets 18. In other words, ambient light can pass from outside to pass through the aperture 21, the body of elongated part 12, and the facets 18 to reach the top side of the disk shaped second planar member 25. Unlike the prior-art product of providing no other reflection surface below the facets 18 to return the light to the eyes of the inspecting person, the second planar member 25 made of an opaque material, such as metal or plastic, is positioned in horizontal orientation attaching the common linear tip portion 17 of the end region 35 for scattering or reflecting the light that is able to pass through the interface of the facets 18 to give an image of the second legend 28 on the top side of the two half planes. For example, the legend 28 may be engraved words like "full fluid" or symbols colored on the top surface of the round-shaped second planar member 25 to provide a clear indicator about the liquid-level in normal range via a direct image with less ambiguity.

In another specific embodiment with liquid-level below normal range, as shown in FIG. 1 as well as in a cross-sectional view of FIG. 3, the facets 18 form another interface between the transparent material and air with the liquid level being lower than the end region 35. Since the refraction index of the transparent material is much larger than that of air or vapor of liquid on the other side of the interface, an internal reflection is activated for incoming ambient light travels along the vertical line to reach the interface to reflect to the sides of the first planar member 20 vertically inserted to the slot from the common linear tip portion 17. Similarly, scattering light from the first legend 19 engraved on the sides of the first planar member 20, which is also an opaque material such as metal or plastic, can be substantially totally reflected from the interface back up to allow an image of the first legend 19 visible to the eyes of an inspecting person from the aperture 21 of the head part 31. Thus, the legend 19, such as "low fluid" or other symbol distinct from the second legend 28, engraved on the sides of the first planar member, provides a direct indicator for warning a low liquid-level.

In certain situations, depending on type of the liquid in the enclosure tank as well as the environment conditions, a certain thickness residue layer of the liquid (not shown explicitly) may be retained on the facets 18. This residue may potentially reduce the facet reflectivity so that most incoming light may penetrate through the facets 18 but not through the next interface between the layer of liquid and the air (vapor) below. The residue may have an irregular shape and may or may not cause internal reflection, and light therefore may be either trapped within this residue layer of liquid by or refracted to random directions so that no clear image of the engraved (first or second) legend is seen in aperture region 21 due to poor return light from thereof. Thus, what an inspecting person sees is substantially dimmed image or merely dark fuzzy background. If a prior-art product as shown in U.S. Pat. No. 3,796,098 is used, the dark view leads to a conclusion that the liquid level is still in normal range but it is apparently false, causing ambiguity or confusion about the true liquid level. Although this scenario may be uncommon, depending on combination of materials chosen for making the gauge device and the liquid type (and may be depended on temperature or other environmental conditions), it cannot be ruled out, and high reliability and accuracy may be very valuable for some applications (e.g., in switchgear where inspections may be infrequent and/or the impact of errors may be high).

However, using the gauge device 11 of one embodiment of the present invention, one obtains a clearer indication of the liquid level status than according to some prior art solutions by seeing either: 1) a clear second legend image when the liquid-level is in normal range; or 2) a either a clear first legend for the situation where the liquid is low or a much dimmed or substantially dark view for the situation when the liquid-level is actually low but with a residue layer coated on the facets. As such, according to this embodiment, ambiguity of the prior-art liquid-level gauge device may be reduced.

Figure 3:
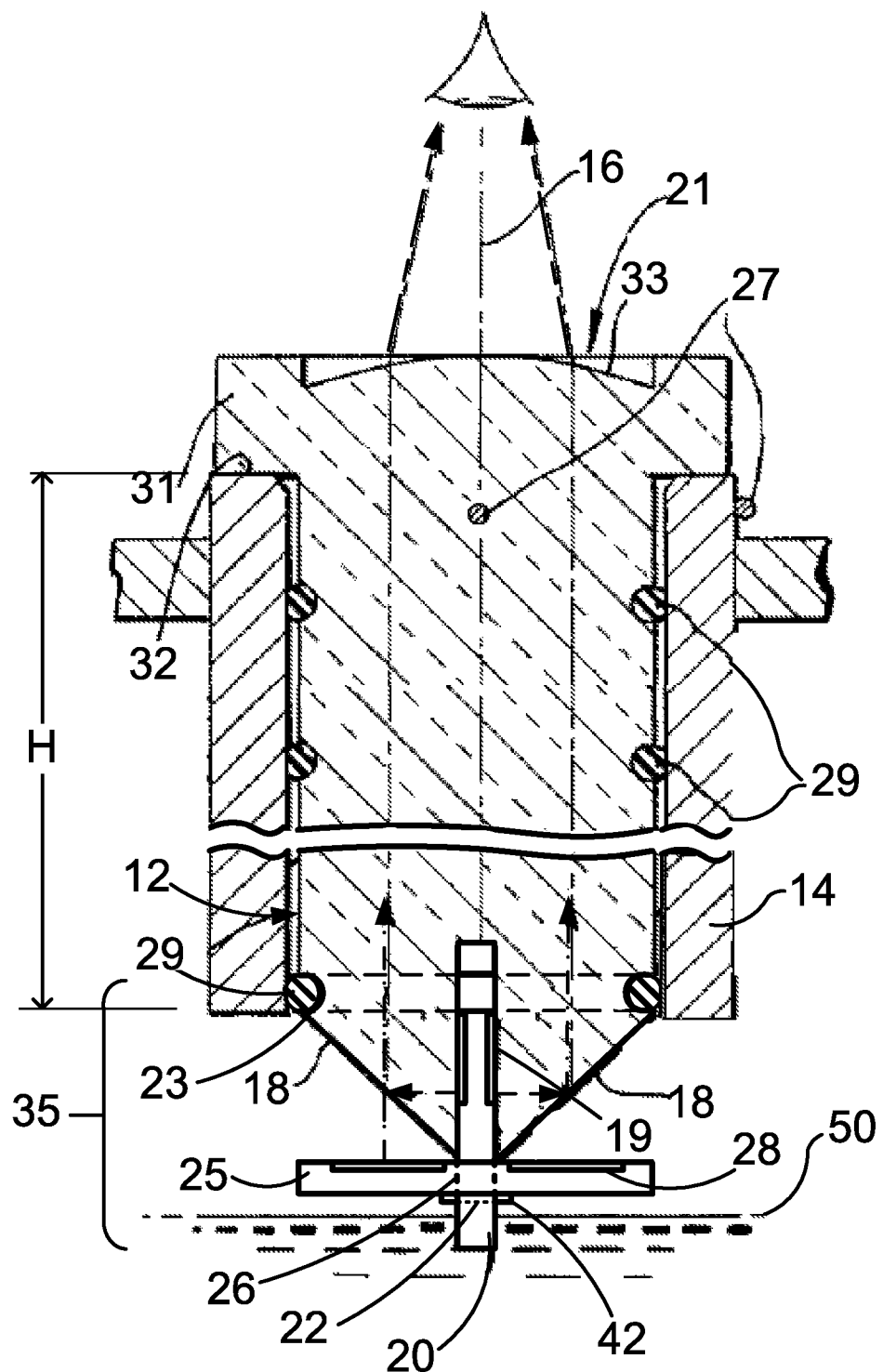
FIG. 3 is a cross-sectional view of the liquid-level gauge device of FIG. 1, shown with a low liquid-level in the tank according to an embodiment of the present invention.

Referring to FIGS. 1, 2, and 3, it may be seen that the liquid-level gauge device 11 of one embodiment of the present invention includes an elongated body 12 of transparent material disposable through the lid 13 of an enclosure tank containing the liquid to be gauged and a receiving collar 32 and socket 14 for the elongated transparent body 12 as a plug. The elongated transparent body 12 has an axis 16 generally corresponding to the normal line of sight along an axial direction 16 of the collar 32 and the socket 14 from the tank exterior to the tank interior down to the common linear tip portion 17 connecting the two facets 18. Each facet 18 forms an angle relative to the axis direction 16. The first planar member 20 is inserted from tip portion 17 and bears a legend area 19 on each side surface thereof and visible from the aperture region 21 by internal reflection of the scattering light from the facet 18 to the legend area 19 when the other side of the facet 18 is air and free from any contact with the liquid in the enclosure tank.

As seen from FIG. 2, the legend area 19 is rendered invisible when the facet 18 is fully contacted by the liquid in the tank in supposed normal range, as the liquid impedes the necessary internal reflection from the facet to the legend and back by lowering the difference in refractive indices encountered at the facet boundary to the point at which an incident ray parallel to the axis 16 is refracted rather than reflected at the facet. Other embodiments operate using only one facet formed on the end region 35 of the elongated body part 12. In such other embodiments, only one side of the first planar member includes a legend and the second planar member may only extend to one half the illustrated embodiment. Such embodiments may be even more cost effective. However, it has been found advantageous in some embodiments having two facets opposite each other with two-sided legend 19, such as that shown in FIGS. 4 and 5 to provide a larger and clearer visual indication in instances where such visual indication is a higher priority.

In one embodiment, the most advantageous angle between the facet 18 and the axis 16 has been found to be 45 degrees, though other angles may be useful in other embodiments.

Figure 4:
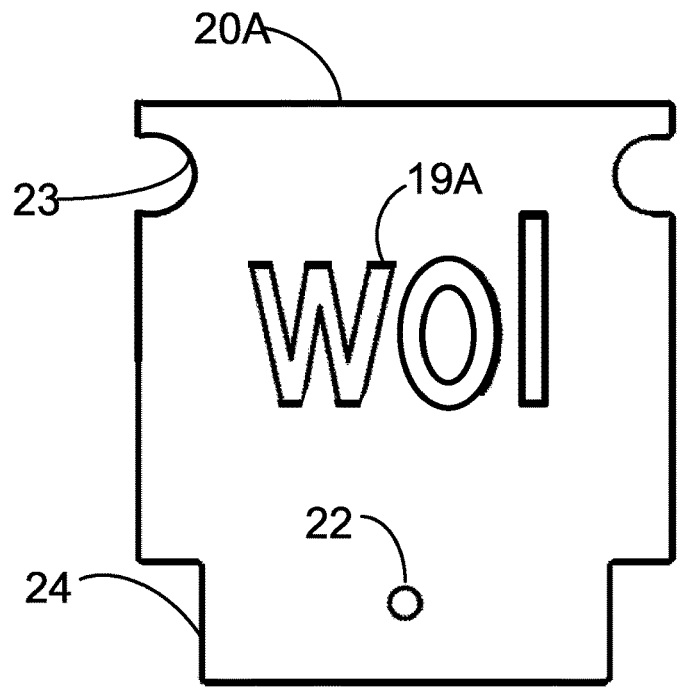
FIG. 4 is a first side view of a planar member for inserting in a slot vertically into the elongated part according to an embodiment of the present invention.
Figure 5:
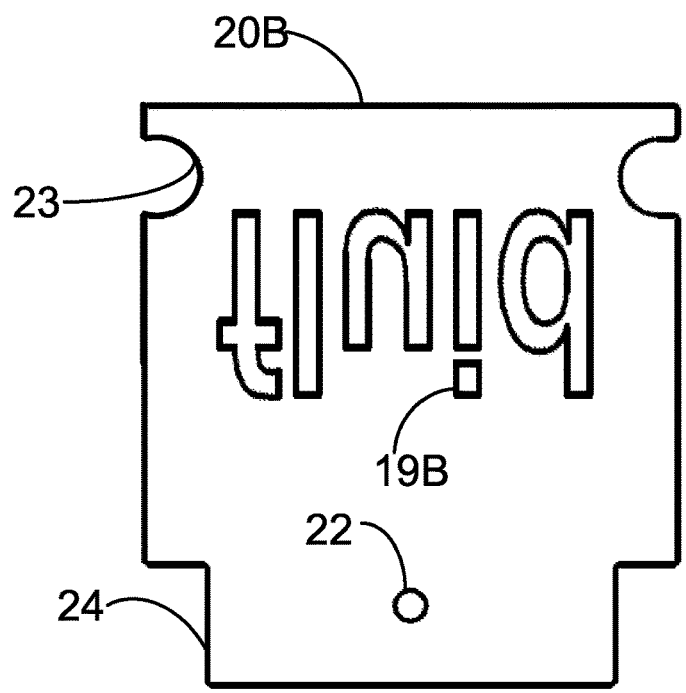
FIG. 5 is a second side view of the planar member of FIG. 4.

Referring to FIGS. 2 and 3, a pair of facets 18 is shown to have the legend borne on two sides of an opaque first planar member 20 disposed in a slot cut from the linear tip portion 17 vertically upward into the body part 12. This configuration allows reflection of different messages from each side 20A or 20B of the first planar member 20, as shown in FIGS. 4 and 5. The legend shown in those figures is, of course, only one example of many possible warning indicators. Note the side-to-side and top-to-bottom reversal of the letters are required for the case shown in the FIG. 4. Alternatively, a pattern can be used to replace words.

The opaque body of the first planar member 20 may be formed of a piece of multi-layered plastic of the type known as Lamicoid, having at least two layers of contrasting color, so that engraving each side of it will produce the legend 19 with lettering of one color on a background of another color. In the present application, one desirable combination would be white letters on a red background, red for danger and white for maximum legibility.

Similarly, the opaque body of the second planar member 25 may be formed of a piece of multi-layered plastic of the type known as Lamicoid, having at least two layers of contrasting color, so that engraving the top side of it only will produce the legend 28 with lettering of one color on a background of another color. In the present application, one desirable combination would be white letters on a green background, green for safe and white for maximum legibility.

In an embodiment, the first planar member 20 is made of a piece of plastic bearing the legend engraved on each side may be conveniently cemented into a slot cut from the tip portion 17 where two facets 18 join together as a bottom of the end region 35 of the transparent body part 12. In such a protected fixture, the liquid being gauged cannot foul or obscure the readability of the legend. The second planar member 25 is a round disk shape attached horizontally to near the bottom part of the first planar member 20 with legend area formed facing up on two half planes of the round disk separated by the linear tip portion 17.

Referring to FIGS. 2 and 3, a retaining pin 27 of a generally D-shaped configuration may be used to hold the body part 12 in place against internal tank pressure or external tampering. The retaining pin 27 is applied through the body part 12 as well as the collar 32 and the socket 14 after disposing the gauge device 11 into the position. For additional security against tampering, the curved and straight legs of the retaining pin 27 may be brought together and fastened by a lead seal.

As shown, the elongated body part 12 is sealed to the inner wall of the collar 32 and the socket 14 by one or more O-rings 29 using oil-resistant material such as Neoprene or Viton, borne in circumferential notches formed on the elongated body part 12 to maintain the submersible integrity of the tank and its contents. The use of O-rings surrounding the cylindrical shaped body part 12 allows the sealing to be independent of the judgment of the operator inserting the body part 12, since the seating force is dependent only on the spacing between the body part 12 and the inner surface of the collar 32 and the socket 14. It should be appreciated, however, that the gauge device of the present invention could be constructed with mating screw threads on the elongated body part 12 and the socket 14, with a gasket (not shown) provided between the head part 31 of the body part 12 and the collar 32 and the socket 14, to complete the seal. Such an arrangement might well be desirable in applications having high internal pressures in the tank, where the added pressure integrity would offset the advantage of independence of operator judgment shown in the O-ring seal arrangement.

The aperture region 21 is formed at the head portion 31 having a larger diameter than the elongated body part 12, which seats against the collar 32 to limit the inward motion of the body part 12 down to the socket 14. The top surface of the aperture region 21 is generally flat. Alternatively, the top surface is a curved surface 33 forming a lens for better viewing ability from off-axis positions and magnifying the image of the legend. In an embodiment, the head part 31 (at least the inner portion including the aperture region 21) and elongated body part 12 are made of a same transparent material. A preferred material is Lucite.

In an embodiment, as shown in FIGS. 4 and 5, the first planar member, 20A or 20B, is substantially a rectangular shaped plate having a uniform thickness, and a common width through a major portion of its height up to a top portion except a smaller bottom portion 24 having a reduced width. The top portion is configured with a pair of notches 23 that is shaped the same as the recessed notches formed on the circumferential surface of the elongated part 12. The bottom portion 24 further includes a through-hole 22 formed in its middle region.

Figure 6:
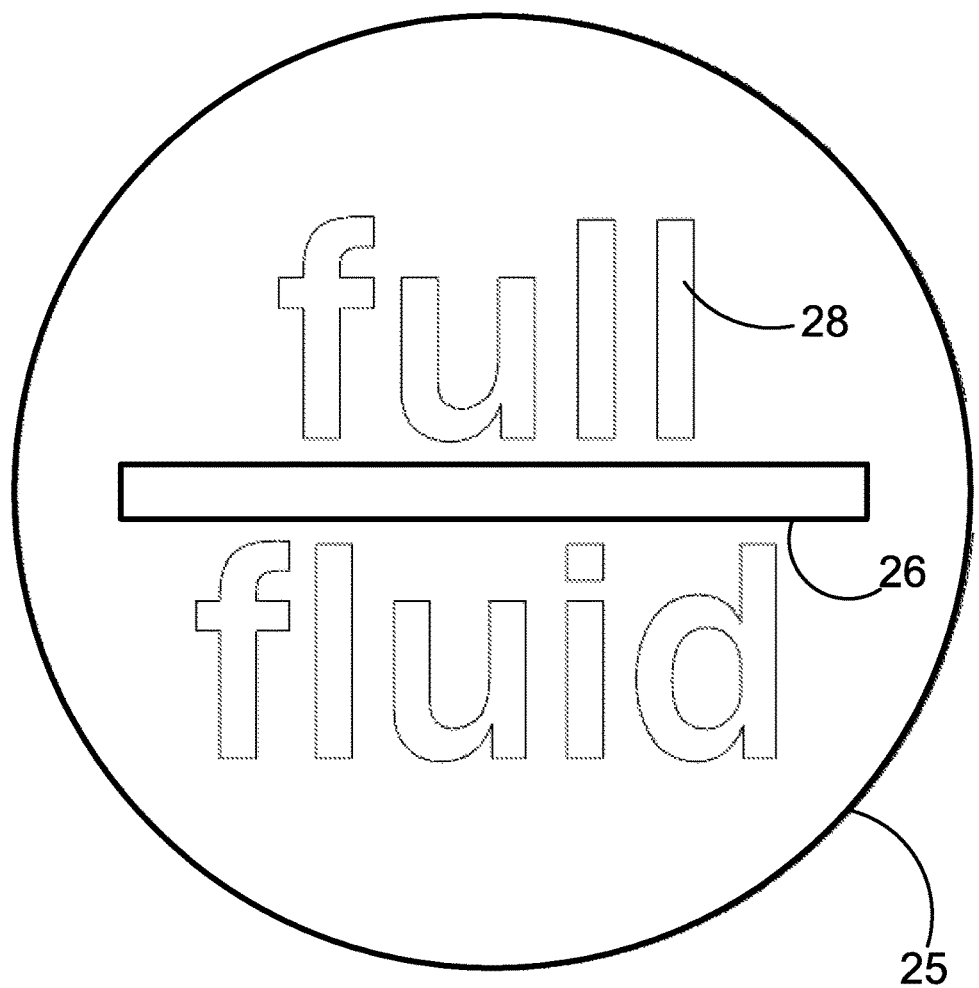
FIG. 6 is a top view of another planar member for horizontally coupling with the planar member of FIG. 4.

In another embodiment, FIG. 6 shows a narrow linear opening 26 formed in a central portion along a central line (in some embodiments along the diameter) of the round-shaped second planar member 25. The length and the width of the narrow linear opening 26 are configured to allow the bottom portion 24 of the first planar member 20 to pass through, after inserting the top portion (with its major height) of the first planar member 20 into the slot of the elongated part 12 from the linear tip portion 17, for perpendicularly coupling the second planar member 25 with the first planar member 20. Further, the through-hole 22 in the bottom portion 24 of the first planar member 20 is positioned to be fully below and substantially leveled with a bottom surface of the second planar member 25 so that a hitch pin (not shown) can be used to plug in the through-hole 22 for fastening the two planar members together.

From the foregoing, it may be seen that a self contained liquid-level warning device has been described, and some embodiments with reduced ambiguity visually indicate the absence of a desired liquid-level in a tank with a high degree of reliability and independence of the environment. Some embodiments also resist fouling by the measured liquid and are unaffected by mechanical or power failure, as well as featuring an elegant and inexpensive construction.

Although specific embodiments of the present invention have been described, it will be understood by those of skill in the art that there are other embodiments that are equivalent to the described embodiments. For example, various embodiments and/or examples of the present invention can be combined. Accordingly, it is to be understood that the invention is not to be limited by the specific illustrated embodiments, but only by the scope of the appended claims.

What is claimed is:

1. A liquid-level gauge comprising,
a body of transparent material having a head part connected to an elongated part with an end region vertically disposable through a matching socket with a collar to be engaged with a liquid-level in the enclosure tank, the body of transparent material allowing a vertical line of sight from outside via the head part to the end region inside the matching socket, the end region including two facets formed from two opposing peripheral sides of the elongated part toward a common linear tip portion with an angle of approximately 45 degrees relative to the vertical line;
a first planar opaque member partially inserted in a slot cut from the linear tip portion along the vertical line into the elongated part, the first planar opaque member bearing a first legend on each of two opposite sides; and
a second planar opaque member perpendicularly coupled with the first planar member and attached at the linear tip portion to form two half planes bearing a second legend facing the two facets respectively;
wherein the first legend is visible from the head region when the two facets are fully above the liquid-level in the enclosure tank;
wherein the second legend is visible from the head region when the two facets are fully submerged below the liquid-level at a normal range in the enclosure tank;
wherein a dimmed view with neither the first legend nor the second legend being clearly visible is still an indicator that the liquid-level is below normal range;
wherein the elongated part comprises a substantially cylindrical shape having a diameter configured to be fitted freely with a gap into the matching socket and being smaller than a lateral dimension of the head part;
wherein the elongated part comprises one or more recessed notches and further comprising one or more O-rings for sealing the gap between the elongated part and the matching socket:
wherein the first planar opaque member comprises a uniform thickness substantially fitting the slot and a width substantially equal to the diameter of the cylindrical part throughout major height portion up to a top region inside the slot except a bottom region with a reduced width, the top region having two recessed notches matching the recessed notch in the cylindrical body next to the edges of the two facets, the bottom region comprising a through-hole.

2. The liquid-level gauge of claim 1 wherein the one or more recessed notches includes at least one notch surrounding the circumferential surface next to edges of the two facets.

3. The liquid-level gauge of claim 1 wherein the second planar opaque member comprises a substantially round disk shape having the same diameter of the cylindrical body and having a narrow linear opening along a center part of the diameter that separates the two half planes, the narrow linear opening being configured to have a length and a width sufficient to allow a reduced width portion of the first planar opaque member to pass through.

4. The liquid-level gauge of claim 3 wherein the second planar opaque member is coupled to the first planar opaque member by allowing the bottom region of the first planar opaque member to pass through the narrow linear opening such that top surface of two solid portions beyond the narrow linear opening of the second planar opaque member touch the common linear tip portion of the two facets and the through-hole in the bottom region is below and leveled with bottom surface of the second planar opaque member allowing a hitch pin to be plugged in the through-hole for locking them together.

5. The liquid-level gauge of claim 1 wherein the first legend comprises at least a letter, a color, a symbol that is distinctly different from the second legend engraved only on two half planes of a top surface of the second planar opaque member.

6. The liquid-level gauge of claim 1 wherein the transparent material has refraction index comparable with that of the liquid.

7. The liquid-level gauge of claim 1 wherein transparent material is selected from acrylic glass, soda-lime glass, quartz.

8. The liquid-level gauge of claim 1 wherein the head part comprises an aperture region at an top-most part of the vertical line of sight allowing a view of either an image of the first legend via light substantially total reflected by the two facets from scattering light of the first legend engraved on the first planar member when the two facets are fully above the liquid-level in the enclosure tank or an image of the second legend via light transmitted through the two facets from scattering light of the second legend engraved on the second planar member.

9. A method for detecting liquid-level in an enclosure tank, the method comprising,
providing a body of transparent material having a head part connected to an elongated part with an end region allowing a vertical line of sight from outside via the head part to the end region, the end region including two facets formed from two opposing peripheral sides of the elongated part toward a common linear tip portion with an angle of approximately 45 degrees relative to the vertical line;
assembling a first planar member of opaque material coupled perpendicularly with a second planar member of opaque material to the elongated part, the first planar member engraved with a first legend on each of two opposite sides being inserted partially into a slot cut from the linear tip portion along the vertical line into the elongated part, the second planar member being attached at the linear tip portion to form two half planes engraved with a second legend facing the two facets respectively;
disposing the elongated part down to a socket with the head part being stopped at a collar through a top wall into the enclosure tank with the end region including the two facets and the first planar member coupled with the second planar member being engaged with the liquid-level in the enclosure tank;
wherein providing the body of transparent material comprising forming a cylindrical shape for the elongated part having a diameter fitting freely with a gap in the socket;
wherein the first planar member has a uniform thickness substantially fitting into the slot and a width substantially equal to the diameter of the cylindrical part throughout major height portion up to a top region inside the slot except a bottom region with a reduced width, the top region having two recessed notches matching the recessed notch on the elongated part, the bottom region comprising a through-hole;
wherein the second planar member comprises a substantially round disk shape having the same diameter of the cylindrical body and having a narrow linear opening along center part of the diameter that separates the two half planes, the narrow linear opening being configured to have a length and a width sufficient to allow the minor height portion with the reduced width of the first planar opaque member to pass through.

10. The method of claim 9 wherein the cylindrical shaped elongated part comprises one or more recessed notches for respectively holding one or more O-rings surrounding circumferential surface for sealing the gap between the elongated part and the socket.

11. The method of claim 10 wherein the one or more recessed notches includes at least one notches formed next to upper edge of the two facets of the end region.

12. The method of claim 9 wherein the assembling comprises allowing the bottom region of the first planar member to pass through the narrow linear opening of the second planar member such that top surface of two solid portions beyond the narrow linear opening of the second planar member is in touch with the common linear tip portion of the two facets and the through-hole in the bottom region is fully below and leveled with bottom surface of the second planar member allowing a hitch pin to be plugged in the through-hole for locking them together.

13. The method of claim 9 wherein the elongated part comprises a sufficient length for the elongated part to allow the end region at least fully submerged below the liquid-level initially stored in the enclosure tank.

14. A liquid level gauge comprising:
a body portion having an axis generally corresponding to a normal line of sight from an outer end to an inner end;
a tip portion positioned at the inner end of the body portion, the tip portion having a first facet arranged at a first angle;
a first legend bearing portion proximate the tip portion in a first orientation to the tip portion, the first legend bearing portion including a first visible indicator, the first visible indicator being arranged to be visible from the outer end of the body when a medium having an adequately differing index of refraction from the tip portion is present adjacent to the first facet; and
a second legend bearing portion proximate the tip portion in a second orientation having a second angle relative to the first orientation of the first legend bearing portion, the second angle being different than the first angle, the second legend bearing portion including a second visible indicator, the second visible indicator being visible from the outer end of the body by line-of-sight when a medium having a similar index of refraction to the tip portion is present adjacent to the first facet;
wherein the first orientation is approximately horizontal and aligned with the axis and wherein the second orientation is substantially perpendicular to the first orientation and normal to the axis, and further wherein the first angle is approximately 45 degrees, and wherein the second angle is approximately 90 degrees;
wherein the tip portion further comprises a second facet arranged at a second angle and wherein opposite sides of the first legend area include separate and distinct letters or symbols oriented differently thereon;
wherein the first legend bearing portion and the second legend bearing portion are perpendicular metal plates attached to the tip portion, wherein the first visible indicator is a low fluid level indicator, and wherein the second visible indicator is an adequate fluid level indicator;
wherein the first legend bearing portion comprises an opaque planar member inserted into a slot in the tip portion and having portions of the first visible indicator on opposite sides thereof, and further wherein the second legend bearing portion comprises a second opaque planar member having a slot, wherein a portion of the first opaque planar member passes through the slot.

15. The liquid level gauge of claim 14 wherein the second opaque planar member abuts an end of the tip portion and is held in place by a pin.

16. The liquid level gauge of claim 15 wherein the first planar member has a narrow portion that fits through the slot.

17. The liquid level gauge of claim 16 wherein said second opaque planar member is substantially circular and has a diameter substantially the same as the body portion.

* * * * *